US007289170B2

(12) United States Patent
Jun

(10) Patent No.: US 7,289,170 B2
(45) Date of Patent: Oct. 30, 2007

(54) METHOD AND APPARATUS FOR COMPENSATING FOR INTERLACED-SCAN TYPE VIDEO SIGNAL

(75) Inventor: In Han Jun, Kyoungki-do (KR)

(73) Assignee: Boe Hydis Technology Co., Ltd., Kyoungki-do (KR)

( * ) Notice: Subject to any disclaimer, the term of this patent is extended or adjusted under 35 U.S.C. 154(b) by 461 days.

(21) Appl. No.: 10/933,022

(22) Filed: Sep. 2, 2004

(65) Prior Publication Data

US 2005/0179826 A1 Aug. 18, 2005

(30) Foreign Application Priority Data

Feb. 16, 2004 (KR) ..................... 10-2004-0010115

(51) Int. Cl.

*H04N 3/14* (2006.01)
*H04N 7/01* (2006.01)
*H04N 9/64* (2006.01)
*H04N 11/20* (2006.01)
*G09G 3/36* (2006.01)

(52) U.S. Cl. ...................... 348/790; 348/793; 348/453; 348/716; 348/718; 345/98

(58) Field of Classification Search ................ 348/792, 348/793, 575, 716, 718, 458; 345/98
See application file for complete search history.

(56) References Cited

U.S. PATENT DOCUMENTS

| | | | | |
|---|---|---|---|---|
| 5,790,096 | A * | 8/1998 | Hill, Jr. | 345/600 |
| 6,072,457 | A * | 6/2000 | Hashimoto et al. | 345/100 |
| 6,184,969 | B1 * | 2/2001 | Fergason | 349/196 |
| 6,195,086 | B1 * | 2/2001 | Perlman et al. | 345/213 |
| 6,683,595 | B2 * | 1/2004 | Ikeda | 345/95 |
| 2003/0086016 | A1 | 5/2003 | Voltz et al. | |
| 2004/0080503 | A1 * | 4/2004 | Jones et al. | 345/211 |

* cited by examiner

*Primary Examiner*—Brian P. Yenke
(74) *Attorney, Agent, or Firm*—Ladas & Parry LLP

(57) ABSTRACT

Disclosed are an apparatus and a method for compensating for an interlaced-scan type video signal for stably displaying the video signal in the LCD panel. An aft part of $264^{th}$ data of a first field and a fore part of $23^{rd}$ data of a second field are stored in memories. A present video signal is determined whether the present video signal is a first field signal or a second field signal through an equalizing pulse period. If the present video signal is the first field signal, a fore part of $23^{rd}$ data is copied to the first data field, and if the present video signal is the second field signal, the aft part of the $263^{rd}$ data is added to the second field data. In case of a PLA-type video signal, first data represent $23^{rd}$ data, and final data represent $313^{rd}$ data.

6 Claims, 6 Drawing Sheets

METHOD AND APPARATUS FOR COMPENSATING FOR INTERLACED-SCAN TYPE VIDEO SIGNAL

BACKGROUND OF THE INVENTION

1. Field of the Invention

The present invention relates to a method and an apparatus for compensating for an interlaced-scan type video signal, and more particularly to a method and an apparatus for compensating for an interlaced-scan type video signal, in which interlaced-scan type data for a CRT are divided into two groups supplied into first and second fields, respectively, while artificially complementing shortage of data in first and second fields, thereby displaying the interlaced-scan type video signal in a liquid crystal display (LCD) panel.

2. Description of the Prior Art

According to conventional CRT type display methods, images are displayed by using 525 data lines in countries adopting NTSC (national television standard committee), or displayed by using 625 data lines in countries adopting PAL (phase alternation by line) based on an interlaced scan technique.

Such an interlaced scan technique is adapted for characteristics of a CRT. The term "interlaced scan" refers a scanning technique in which an electron gun slantingly scans data lines of a screen on every other data line, and then, scans remaining data lines in a next stage. FIG. 1 is a view showing a conventional interlaced scan. FIG. 2 is a view showing a display method of an LCD by using a conventional interlaced scan. FIG. 3 is a view showing a first data field for a conventional interlaced scan. FIG. 4 is a view showing a second data field for a conventional interlaced scan. Since the interlaced scan technique may slantingly scan data lines on every other data line, it is impossible to completely scan first and final data lines from one end to other end of a screen. For this reason, only half of the first data line and half of the final data are provided in order to compensate for ends of the screen. Thus, image data for the CRT cannot be divided by two due to the half-data for the first and final data lines, that is, the total number of the data lines is an odd number.

However, the above-mentioned interlaced scan may not be directly applied to an LCD. That is, the data scanning cannot be slantingly carried out in the LCD. Different from the CRT, which forms one frame by combining two fields, the LCD may form one frame by using one field. Therefore, if interlaced scan type data are directly applied to the LCD, only a half of data is provided for a first data line of a first frame and only a half of data is provided for a final data line of a next frame. Accordingly, since the first line of the first frame has half-data and the first line of the next frame has full-data, when data of the first and next frames are simultaneously displayed, the data in the first line may represent an image, which does not reflect data for the first line of the first frame or data for the first line of the next frame. Similarly, data in the final data line may represent an image, which does not reflect data for the final line of the first frame or data for the final line of the next frame when data of the first and next frames are simultaneously displayed. Such a problem may cause a reduction of a viewing area when displaying an image, so 234 lines in EGA-level resolution of 312*234 may be fixed.

SUMMARY OF THE INVENTION

Accordingly, the present invention has been made to solve the above-mentioned problems occurring in the prior art, and an object of the present invention is to provide an apparatus and a method for compensating for an interlaced-scan type video signal, in which a video signal for a CRT is converted into a signal adaptable for an LCD panel in such a manner that the video signal can be stably displayed in the LCD panel.

In order to accomplish this object, there is provided a method for compensating for an interlaced-scan type video signal, the method comprising the steps of: i) storing an aft part of final data provided in a data area of a first field of the interlaced-scan type video signal in a first memory and a fore part of first data provided in a data area of a second field in a second memory; ii) determining whether a present video signal is a first field signal or a second field signal through an equalizing pulse period of each field; iii) counting a number of data lines of the first and second field signals; iv) copying the first data stored in the second memory to a fore part of first data provided in the data area of the first field and storing the aft part of the final data provided in the data area of the first field in the first memory, if the data lines belong to the first field; and v) storing the fore part of the first data provided in the data area of the second field in the second memory and copying the data stored in the first memory to the aft part of the final data of the second field, if the data lines belong to the second field.

According to another aspect of the present invention, there is provided an apparatus for compensating for an interlaced-scan type video signal, the method comprising the steps of: a decoder outputting a horizontal synchronous signal and a compensated video signal by processing the interlaced-scan type video signal; a first memory for storing an aft part of predetermined data provided in a first field of the interlaced-scan type video signal processed by the decoder; a second memory for storing a fore part of predetermined data provided in a second field of the interlaced-scan type video signal processed by the decoder; a counter for outputting a count signal by counting a number of horizontal synchronization included in a horizontal data line of the interlaced-scan type video signal processed by the decoder; and a control unit determining whether a present video signal is a first field signal or a second field signal by detecting a falling edge signal transmitted from a first data line and a second data line of each field, adding the fore part of the predetermined data of the second field stored in the second memory to the first field of the interlaced-scan type video signal processed by the decoder based on the count signal of the counter at a point of time of receiving the first field signal, and adding the predetermined data of the first field stored in the first memory to the second field when the predetermined data of the second field of the interlaced-scan type video signal processed by the decoder is received.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
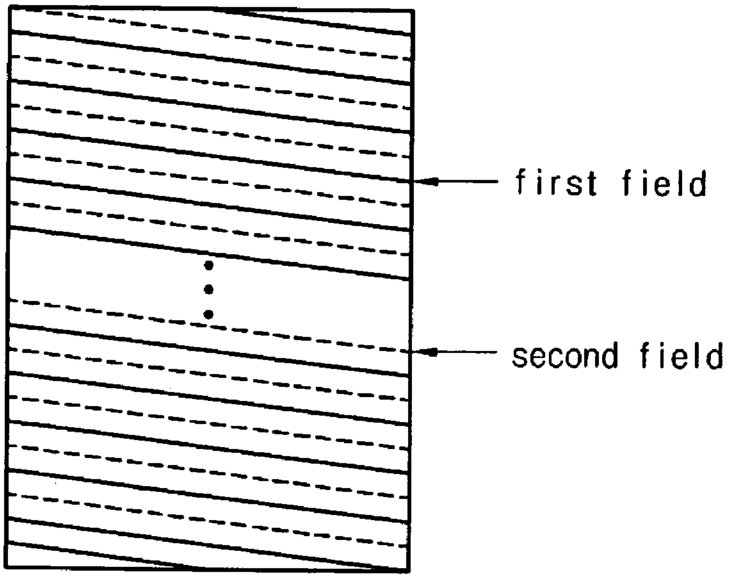
FIG. 1 (PRIOR ART)
FIG. 1 is a view showing a conventional interlaced scan.
Figure 2:
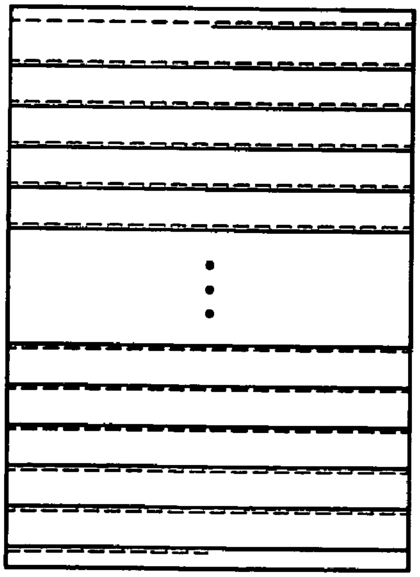
FIG. 2 (PRIOR ART)
FIG. 2 is a view showing a display method of an LCD through a conventional interlaced scan.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 5:
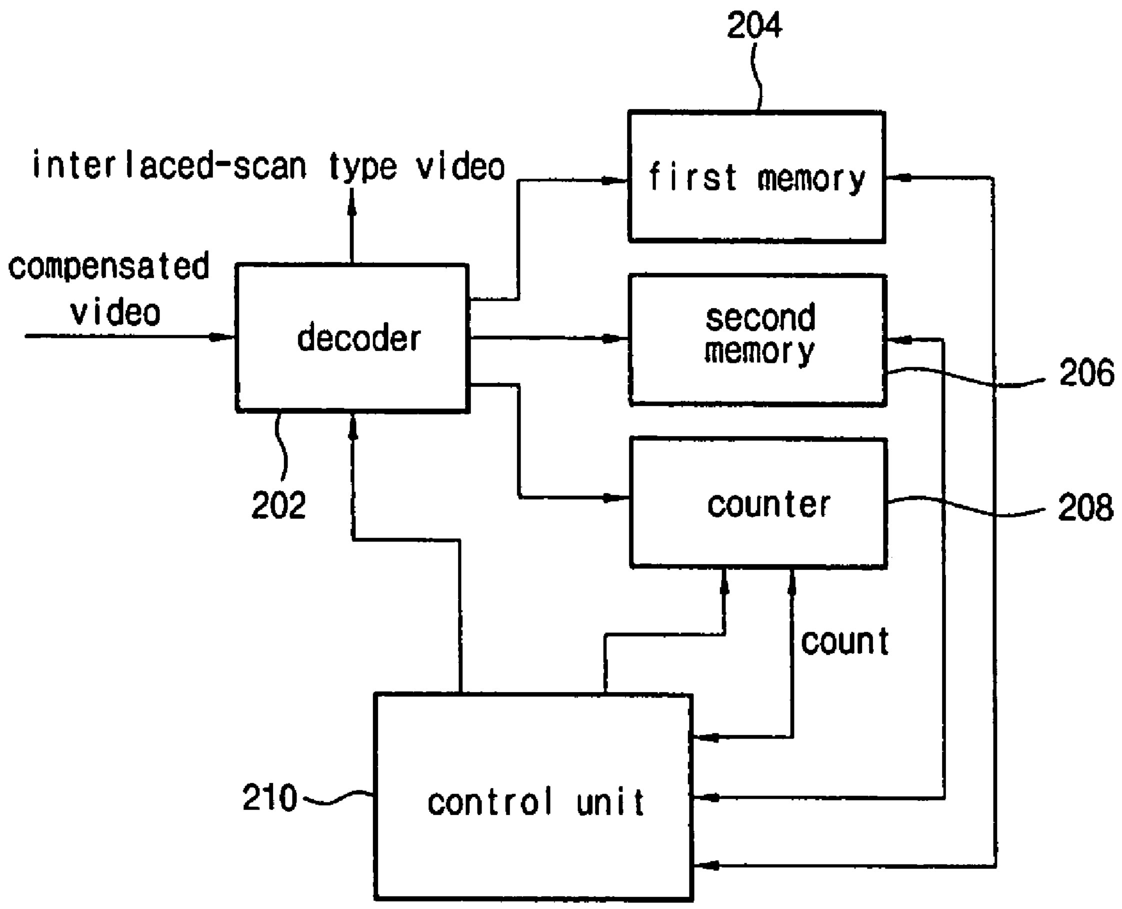
FIG. 5 is a block view showing a structure of an apparatus for compensating for an interlaced-scan type video signal according to one embodiment of the present invention.

The present invention is based on NTSC signals having 525 lines. Real data of NTSC interlaced-scan type video data may exist in a range from a $23^{rd}$ data line to $263^{rd}$ data line. Data existing in the fore part of the data lines are used for a synchronization period, in which an equalizing pulse period may exist in a range from a $1^{st}$ data line to a $9^{th}$ data line. In order to effectively display such interlaced-scan type video data in an LCD panel, various conditions described in the following description may be required. FIG. 5 is a block view showing a structure of an apparatus for compensating for an interlaced-scan type video signal according to one embodiment of the present invention. The apparatus for compensating for the interlaced-scan type video signal includes a decoder 202, a first memory 204, a second memory 206, a counter 208 and a control unit 210.

The decoder 202 processes the interlaced-scan type video signal inputted thereto, thereby outputting a horizontal synchronous signal and a compensated video signal. The first memory 204 stores an aft part of $263^{rd}$ data in a first field of the interlaced-scan type video signal processed by the decoder 202. The second memory 206 stores a fore part of $23^{rd}$ data in a second field of the interlaced-scan type video signal processed by the decoder 202. The counter 208 counts the number of horizontal synchronization included in horizontal data lines of the interlaced-scan type video signal processed by the decoder 202 and outputs a count signal to the control unit 210.

Figure 3:
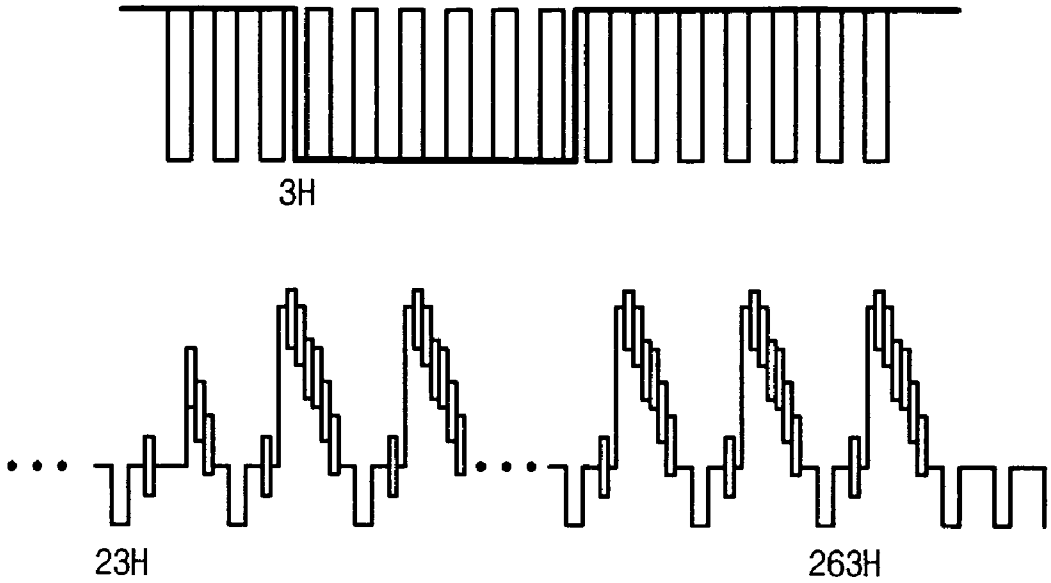
FIG.3 (PRIOR ART)
FIG. 3 is a view showing a first data field for a conventional interlaced scan.
Figure 4:
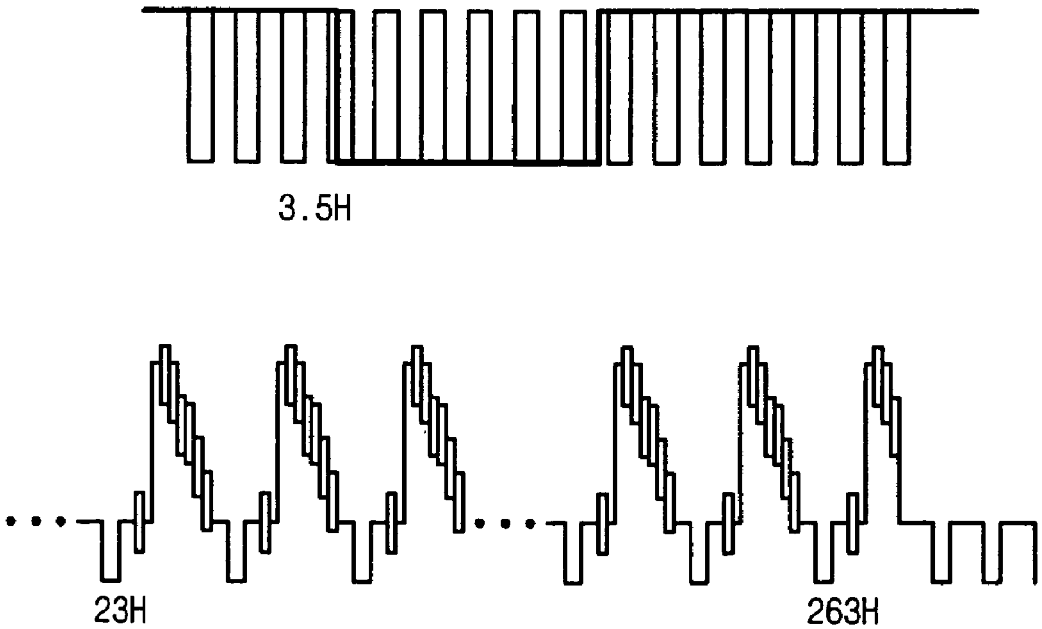
FIG.4 (PRIOR ART)
FIG. 4 is a view showing a second data field for a conventional interlaced scan.

The control unit 210 determines whether a present video signal is a first field signal or a second field signal by detecting falling edge signals transmitted from a $3^{rd}$ data line and a $3.5^{th}$ data line, which exist in the equalizing pulse period. FIG. 3 is a view showing a first data field for an interlaced scan, and FIG. 4 is a view showing a second data field for an interlaced scan. As shown in FIG. 3, when the falling edge signal is transmitted to the control unit 210 from the $3^{rd}$ data line, the control unit 210 determines that the present video signal is the first field signal. As shown in FIG. 4, when a high signal is transmitted to the control unit 210 from the $3^{rd}$ data line and the falling edge signal is transmitted to the control unit 210 from the $3.5^{th}$ data line, the control unit 210 determines that the present video signal is the second field signal.

At a point of time of receiving the first field signal, the control unit 210 adds the fore part of the $23^{rd}$ data of the second field stored in the second memory 206 to the first field of the interlaced-scan type video signal processed by the decoder 202 based on the count signal of the counter 208. In addition, when $263^{rd}$ data of the second field is received, the control unit 210 adds the $263^{rd}$ data of the first field stored in the first memory 204 to the second field of the interlaced-scan type video signal processed by the decoder 202. Accordingly, the decoder 202 can output the video signal adaptable for an LCD device.

Hereinafter, an operation of the apparatus for compensating for the interlaced-scan type video signal according to the present invention will be described.

When the falling edge signal is transmitted to the control signal 210 from the $3^{rd}$ data line, the control signal 210 determines that the present video signal is the first field signal. At this time, data of the $23^{rd}$ data line having no first-half data thereof (0.5H, wherein H is a horizontal data line) are transmitted to the control unit 210. In a next field, a high signal is transmitted to the control unit 210 from the $3^{rd}$ data line and the falling edge signal is transmitted to the control unit 210 from the $3.5^{th}$ data line. At this time, the full data of the $23^{rd}$ data line are transmitted to the control unit 210. However, data having only first-half data without second-half data may be transmitted to the control unit 210 from the $263^{rd}$ data line. The fore part of the $23^{rd}$ data of the second field and the aft part of the $263^{rd}$ data of the first field are stored in the first and second memories 204 and 206, respectively. After that, the stored fore part of the $23^{rd}$ data of the second field is copied for the fore part of the $23^{rd}$ data line in the first field, and the stored aft part of the $263^{rd}$ data of the first field is copied for the aft part of the $263^{rd}$ data of the second field, in which the fore part of the $23^{rd}$ data line in the first field and the aft part of the $263^{rd}$ data of the second field have no data, so that data may exist in whole periods of all fields. As described above, the control unit 210 can recognize the first field or the second field by detecting the falling edge transmitted from the $3^{rd}$ data line and $3.5^{th}$ data line and can find data transmitted from the $23^{rd}$ data line or the $263^{rd}$ data line based on the number of horizontal synchronous signals counted by the counter 208 because a reference synchronous signal is always added to all horizontal data lines.

Figure 6:
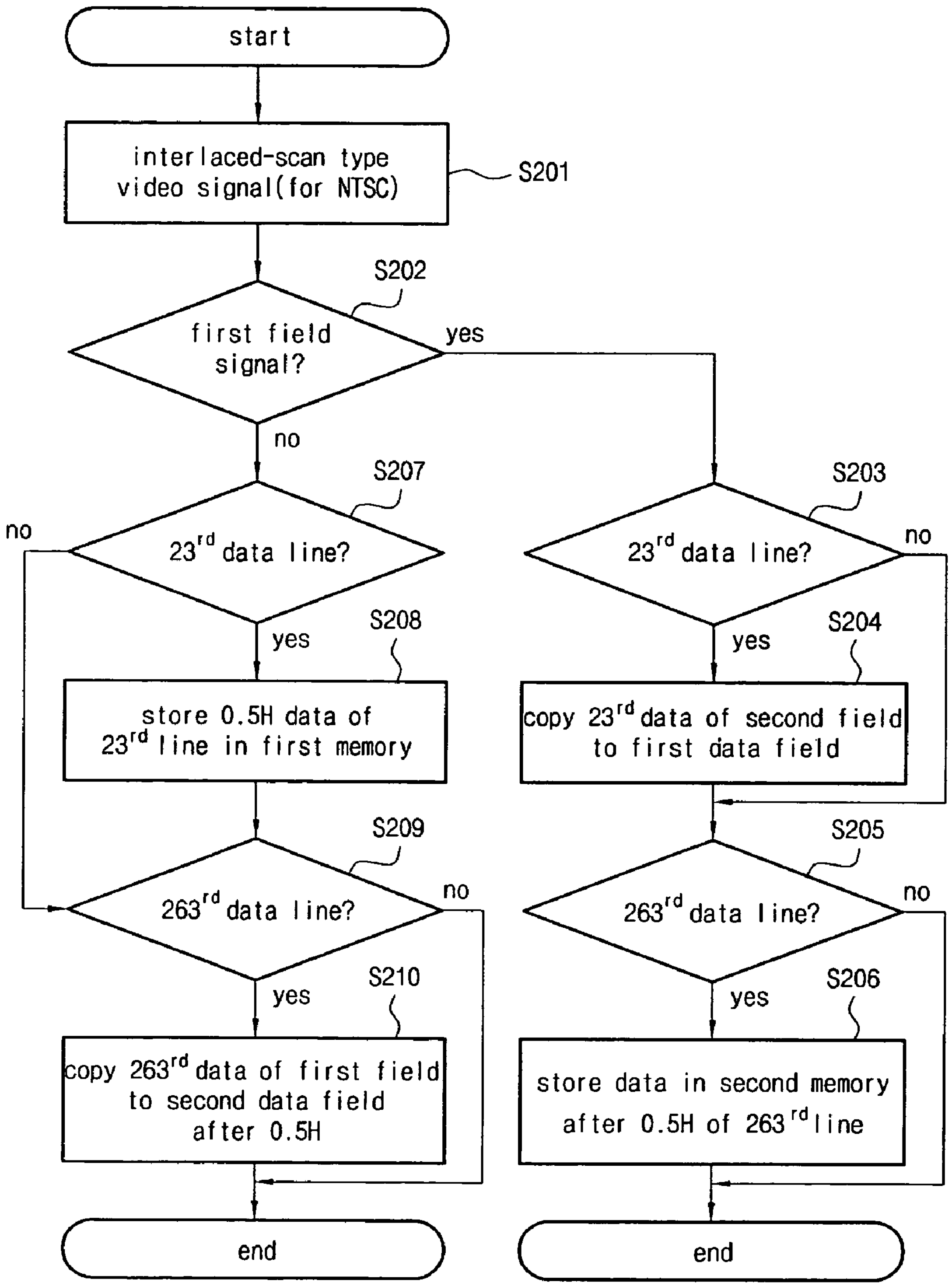
FIG. 6 is a flowchart showing a method for compensating for an interlaced-scan type video signal according to one embodiment of the present invention.

Hereinafter, the method for compensating for the interlaced-scan type video signal will be described with reference to FIGS. 6 to 9. Herein, FIG. 6 is a flowchart showing the method for compensating for the interlaced-scan type video signal according to one embodiment of the present invention, FIG. 7 is a view showing a data copy region according to one embodiment of the present invention, FIG. 8 is a view showing a data copy region in an LCD panel according to one embodiment of the present invention, and FIG. 9 is a view showing a display method of an LCD through an interlaced scan according to one embodiment of the present invention.

Firstly, the control unit 210 stores the aft part of $263^{rd}$ data of the first field of the interlaced-scan type video signal and the fore part of the $23^{rd}$ data of the second field of the interlaced-scan type video signal in first and second memories 504 and 506, respectively (S201). Then, the control unit 210 determines whether or not the present video signal is the first field signal by detecting the falling signal transmitted thereto from the $3^{rd}$ data line or the $3.5^{th}$ data line (S202). If the present video signal is the first field signal, the control unit 210 determines whether or not the data line is the $23^{rd}$ data line (S203).

Figure 7:
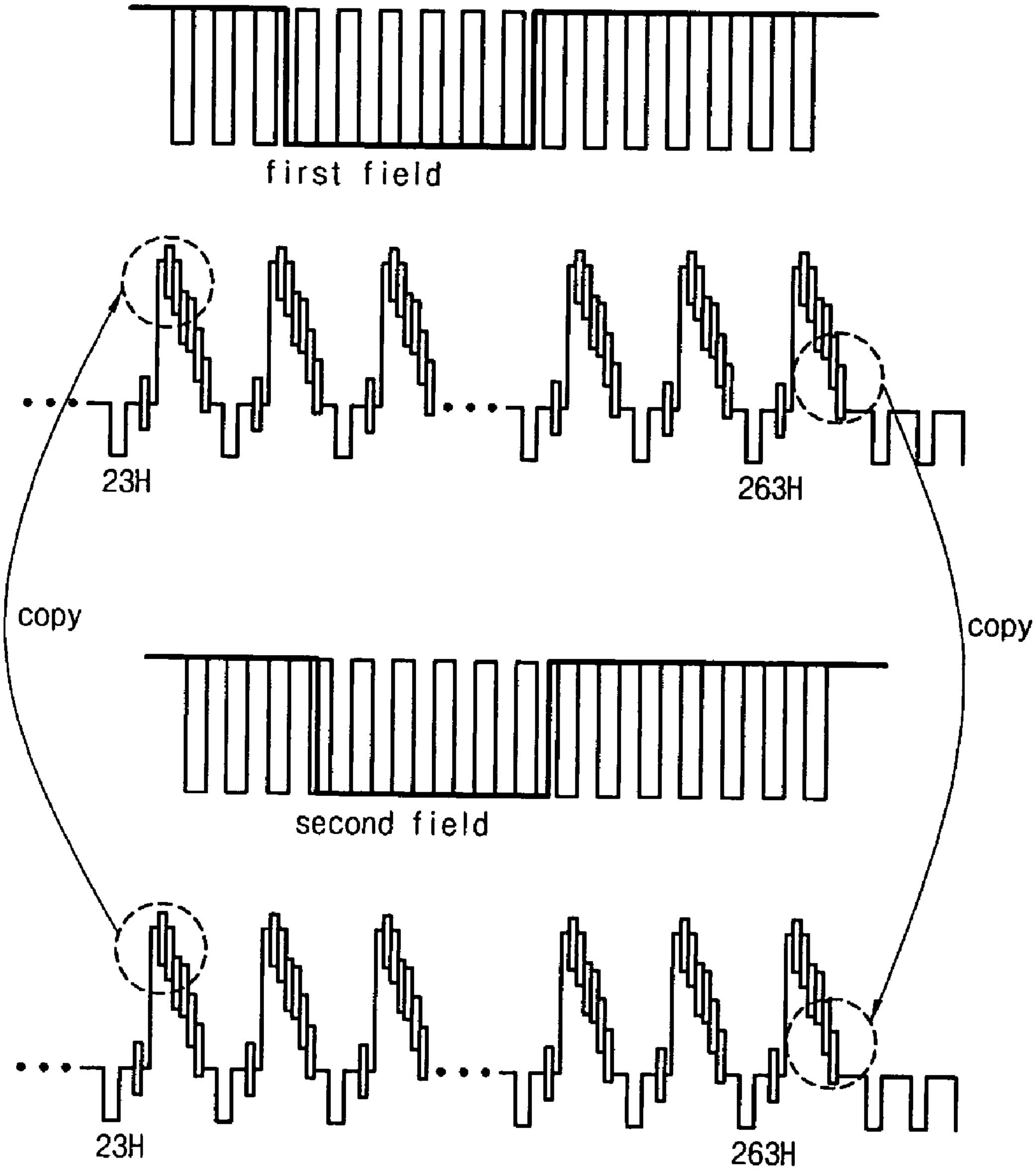
FIG. 7 is a view showing a data copy region according to one embodiment of the present invention.
Figure 8:
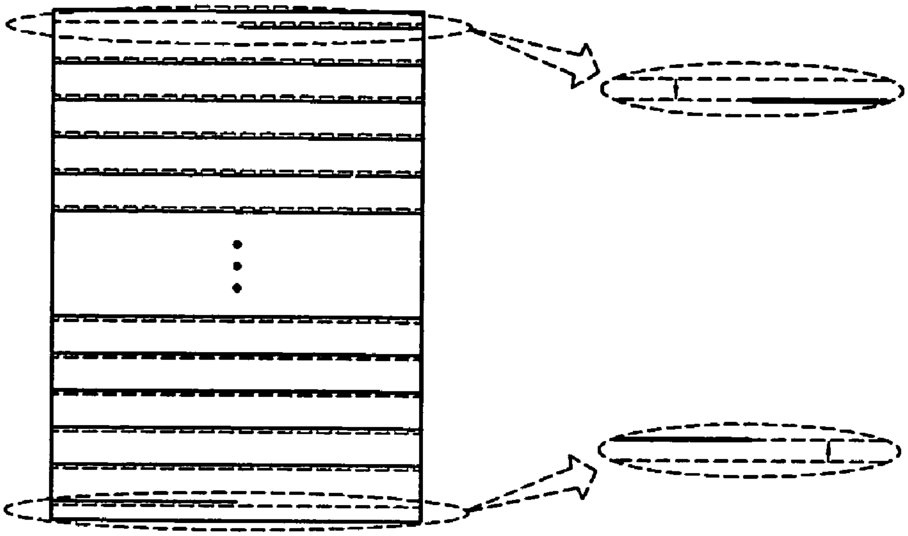
FIG. 8 is a view showing a data copy region in an LCD panel according to one embodiment of the present invention.
Figure 9:
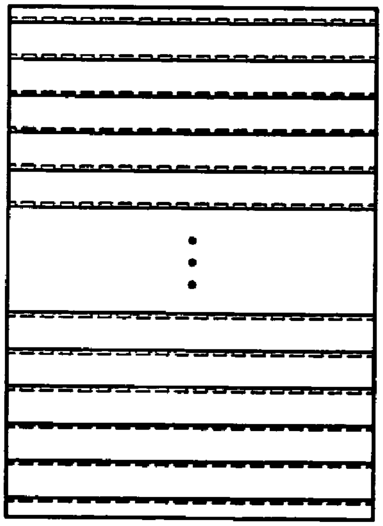
FIG. 9 is a view showing a display method of an LCD through an interlaced scan according to one embodiment of the present invention.

In step 203, if the data line is the $23^{rd}$ data line, as shown in FIGS. 7 and 8, the control unit 210 copies the fore part of the $23^{rd}$ data of the second field stored in the second memory 206 to data of the first field (S204).

In step 203, if the data line is not the $23^{rd}$ data line, the control unit 210 determines whether or not the data line is the $263^{rd}$ line (S205). If the data line is the $263^{rd}$ data line, as shown in FIG. 7, the control unit 210 stores second-half data of the $263^{rd}$ data line in the second memory 206 (S206).

In step 202, the present video signal is not the first field signal, the control unit 210 determines that the present video signal is the second field signal, and then, determines whether or not the data line is the $23^{rd}$ data line (S207). In step 207, if the data line is not the $23^{rd}$ data line, the control unit 210 stores the first-half data (0.5H) of the $23^{rd}$ data line in the first memory 204 (S208).

In step 207, if the data line is not the $23^{rd}$ data line, the control unit 210 determines whether or not the data line is the $263^{rd}$ line (S209). If the data line is the $263^{rd}$ data line, after 0.5H time lapses, as shown in FIG. 7, the control unit 210 copies second-half data of the $263^{rd}$ data line stored in the first memory 204 to data of the second field (S210).

According to the above-mentioned manner, all data of the 525 data lines may be utilized when displaying an image without discarding first and final data, so that it is possible to display an image while updating EGA-level resolution of 312*240 to EGA plus-level resolution of 312*240.

As described above, according to the present invention, the image signal for the CTR is converted in such a manner that the image signal is adaptable for the LCD panel, so the image can be effectively displayed in a display space while updating EGA-level resolution of 312*240 to EGA plus-level resolution of 312*240.

Although a preferred embodiment of the present invention has been described for illustrative purposes, those skilled in the art will appreciate that various modifications, additions and substitutions are possible, without departing from the scope and spirit of the invention as disclosed in the accompanying claims.

For example, although the present invention is described with reference to NTSC signal having 525 lines, the present invention can be adaptable for PAL signals having 625 lines. Since a field of the PAL consists of 313 data lines, the last data period is changed from a $263^{rd}$ data line to a $313^{th}$ data line.

What is claimed is:

1. A method for compensating for an interlaced-scan type video signal having first and second fields of data, each field representing a predetermined number of data lines per a display screen beginning with a first data line and ending with a last data line, the method comprising the steps of:

i) storing the data corresponding to the last predetermined portion of the last data line of the first field (hereinafter "the-first-field-last-data-line-subpart-data") in a first memory and storing the data corresponding to the beginning predetermined portion of the first data line of the second field (hereinafter "the-second-field-first-data-line-subpart-data") in a second memory;

ii) determining whether a present video signal is a first field signal or a second field signal through an equalizing pulse period of each field;

iii) counting a number of data lines of the first and second field signals;

iv) when the present video signal is determined to be a first field signal, copying the-second-field-first-data-line-subpart-data stored in the second memory in the first memory so that the-second-field-first-data-line-subpart-data precede the first data line of the first field stored in the first memory; and v) when the present video signal is determined to be a second field signal, copying the-first-field-last-data-line-subpart-data stored in the first memory in the second memory so that the-first-field-last-data-line-subpart-data is append to the final data line of the second field stored in the second memory.

2. The method as claimed in claim 1, wherein, if the video signal is an NTSC-type video signal, the first data line represents $23^{rd}$ data line, and the final data line represents $263^{rd}$ data line.

3. The method as claimed in claim 1, wherein, if the video signal is a PAL-type video signal, the first data line represents $23^{rd}$ data line, and the final data line represents $313^{rd}$ data line.

4. An apparatus for compensating for an interlaced-scan type video signal, the apparatus comprising:

a decoder outputting a horizontal synchronous signal and a compensated video signal by processing the interlaced-scan type video signal having first and second fields of data, each field representing a predetermined number of data lines per display screen beginning with a first data line and ending with a last data line;

a first memory for storing the data corresponding to the last predetermined portion of the last data line of the first field (hereinafter "the-first-field-last-data-line-subpart-data");

a second memory for storing the data corresponding to the first predetermined portion of the first data line of the second field (hereinafter "the-second-field-first-data-line-subpart-data");

a counter for outputting a count signal by counting a number of horizontal synchronization included in a horizontal data line of the interlaced-scan type video signal processed by the decoder; and a control unit determining whether a present video signal is a first field signal or a second field signal by detecting a falling edge signal transmitted from a first data line and a second data line of each field, adding the-second-field-first-data-line-subpart-data stored in the second memory to precede the data for the first data line of the first field at a time of receiving the first signal of the first field, and appending the-first-field-last-data-line-subpart-data stored in the first memory to continue the data for the last data line of the second field when the last data of the second field is received.

5. The apparatus as claimed in claim 4, wherein the first memory stores the-first-field-last-data-line-subpart-data provided in a data area of the first field of the interlaced-scan type video signal processed by the decoder and the second memory stores the-second-field-first-data-line-subpart-data provided in a data area of the second field of the interlaced-scan type video signal processed by the decoder.

6. The apparatus as claimed in claim 4, wherein the control unit determines whether the present video signal is the first field signal or the second field signal by detecting the falling edge signal transmitted from a $3^{rd}$ data line and a $3.5^{th}$ data line, and, if the falling edge signal is transmitted to the control unit from both $3^{rd}$ data line and a $3.5^{th}$ data line, the control unit determines that the interlaced-scan type video signals are first and second field signals.

* * * * *